United States Patent
Kazi et al.

(10) Patent No.: US 8,166,033 B2
(45) Date of Patent: Apr. 24, 2012

(54) SYSTEM AND METHOD FOR MATCHING AND ASSEMBLING RECORDS

(75) Inventors: Zunaid H. Kazi, San Diego, CA (US); Christopher D. Rosin, San Diego, CA (US); Ramamohan Paturi, San Diego, CA (US); Holden P. Robbins, San Diego, CA (US); Mark W. S. Land, San Diego, CA (US)

(73) Assignee: Parity Computing, Inc., San Diego, CA (US)

( * ) Notice: Subject to any disclaimer, the term of this patent is extended or adjusted under 35 U.S.C. 154(b) by 2127 days.

(21) Appl. No.: 10/376,902

(22) Filed: Feb. 27, 2003

(65) Prior Publication Data

US 2004/0172393 A1 Sep. 2, 2004

(51) Int. Cl.
*G06F 17/30* (2006.01)
(52) U.S. Cl. ........ 707/737; 707/728; 707/739; 707/748; 707/771
(58) Field of Classification Search .................. 707/100, 707/101, 103, 6, 10, 737, 738, 739, 728, 707/748, 771; 700/219; 713/155; 435/6
See application file for complete search history.

(56) References Cited

U.S. PATENT DOCUMENTS

| | | | |
|---|---|---|---|
| 4,905,162 A | 2/1990 | Hartzband et al. | |
| 5,369,707 A * | 11/1994 | Follendore, III | 713/155 |
| 5,404,507 A | 4/1995 | Bohm et al. | |
| 5,664,109 A * | 9/1997 | Johnson et al. | 705/2 |
| 5,666,442 A | 9/1997 | Wheeler | |
| 6,289,342 B1 | 9/2001 | Lawrence et al. | |
| 6,295,533 B2 | 9/2001 | Cohen | |
| 6,438,543 B1 | 8/2002 | Kazi et al. | |
| 6,457,006 B1 * | 9/2002 | Gruenwald | 707/7 |
| 6,523,019 B1 * | 2/2003 | Borthwick | 706/45 |
| 6,542,896 B1 * | 4/2003 | Gruenwald | 707/101 |
| 6,912,549 B2 * | 6/2005 | Rotter et al. | 707/200 |
| 2001/0013035 A1 * | 8/2001 | Cohen | 707/5 |
| 2002/0087743 A1 * | 7/2002 | Givoly | 709/330 |
| 2003/0046280 A1 * | 3/2003 | Rotter et al. | 707/6 |
| 2003/0084017 A1 * | 5/2003 | Ordille | 707/1 |
| 2003/0120651 A1 * | 6/2003 | Bernstein et al. | 707/6 |
| 2003/0124527 A1 * | 7/2003 | Schlager et al. | 435/6 |
| 2003/0145003 A1 * | 7/2003 | Yellepeddy et al. | 707/6 |
| 2003/0177212 A1 * | 9/2003 | Givoly et al. | 709/223 |
| 2004/0003005 A1 * | 1/2004 | Chaudhuri et al. | 707/200 |
| 2004/0064502 A1 * | 4/2004 | Yellepeddy et al. | 709/203 |
| 2004/0107203 A1 * | 6/2004 | Burdick et al. | 707/101 |
| 2004/0107205 A1 * | 6/2004 | Burdick et al. | 707/102 |

OTHER PUBLICATIONS

Hernandez et al. "The Merge/Purge Problem for Large Databases" Proceedings of the 1995 ACM SIGMOD International Conference on Management of Data. pp. 127-138. May 1995. ACM Press.*

(Continued)

*Primary Examiner* — Thuy Pardo
(74) *Attorney, Agent, or Firm* — Sheppard, Mullin, Richter & Hampton LLP; David E. Heisey

(57) ABSTRACT

A system and method for matching and assembling records is provided. One embodiment of the invention assembles records by applying a method for grouping records based on matching fields, assembling a new record as a composite of the matched records, and then repeating the grouping, matching and assembling steps in a cascade where the matching grouping and assembling steps are modified as a function of the cascade step and the assembled records created in earlier steps.

12 Claims, 12 Drawing Sheets

OTHER PUBLICATIONS

Cohen, William. "Data Integration Using Similarity Joins and a Word-Based Information Representation Language" ACM Transactions on Information Systems (TOIS), vol. 18, No. 3. pp. 288-321. Jul. 2000. ACM Press.*

Cohen, William, "Integration of Heterogeneous Databases Without Common Domains Using Queries Based on Textual Similarity." Procs of the 1998 ACM SIGMOD International Conference on Management of Data, vol. 27, No. 2. Jun. 1998. ACM Press.*

Daniel Gildea et al., "Automatic Labeling of Semantic Roles", ACM, 2002, pp. 245-288.*

Fellegi, Ivan P., et al., "A Theory for Record Linkage," Journal of the American Statistical Association, pp. 1183-1210, Dec. 1969, vol. 64, Issue 328, American Statistical Association, Alexandria, Virginia.

Monge, Alvaro E., et al., "The Field Matching Problem: Algorithms and Applications," Second International Conference on Knowledge Discovery and Data Mining, Aug. 1996, pp. 267-270, American Association for Artificial Intelligence, Menlo Park, California.

Cohen, William W., et al., "Learning to Match and Cluster Large High-Dimensional Data Sets for Data Integration," Eighth ACM SIGKDD International Conference on Knowledge Discovery and Data Mining, Jul. 2002, Edmonton, Alberta, Canada.

Newcombe, H.B., et al., "Automatic Linkage of Vital Records," Science, New Series, pp. 954-959, Oct. 16, 1959, vol. 130, Issue 3381.

Winkler, William E., "Advanced Methods for Record Linkage," American Statistical Association, Proceedings of the Section of Survey Research Methods, 1994, pp. 1-21, Bureau of the Census, Washington D.C.

* cited by examiner

1) $\overbrace{\text{C Runciman \& amp;}}^{10}$ $\overbrace{\text{D Wakeling}}^{10}$ [April 1993], "Heap profiling of lazy functional programs," Journal of Functional Programming 3(2), 217-245.

2) $\overbrace{\text{C. Runciman and D. Wakeling.}}^{10}$ Heap profiling of lazy functional programs. Journal of Functional Programming, 3(c):217{246, April 1993.

3) RUNCIMAN, C. AND WAKELING, D. 1993. Heap profiling of lazy functional programs. $\underbrace{\text{J. Funct. Program.}}_{10}$ 3, 2, 217-245.

4) $\overbrace{\text{Heap profiling of lazy functional programs}}^{10}$, Colin Runciman, David Wakeling, Journal of Functional Programming 3(2), pp.217-245 (April 1993)

5) C. Runciman and D. Wakeling. Heap profiling for lazy functional languages. Journal of Functional Programming, April 1993.
$\underbrace{\phantom{xxxxxxxxxxxxx}}_{10}$

FIGURE 1

AUTHOR
    Colin Runciman

AUTHOR
    David Wakeling

TITLE
    Heap profiling for lazy functional languages

PUBLICATION
    Journal of Functional Programming
    volume 3

PAGE
    Start = 217
    End = 245

DATE
    Month = April
    Year = 1993

FIGURE 2

John Smith. History of the fruit fly. Journal of fruit fly. Volume 2. pp 17-25. 2002. University of Hoboken.

Harvey Wallingford, John Smith. Fruit fly oncology. Journal of fruit fly. Volume 1. pp 99-101. 1999. University of Hoboken.

J Smith. Fruit fly genetics. Journal of fruit fly. Volume 2. pp 34-100. 1998. University of New Jersey.

J Smith. Oncology of pleural membrane. JAMA. 2(3). 1998. Institute of Lung Science, Rannikin, SA.

FIGURE 11

Name of Author: John Smith
Location: USA
Organization Type: Academic
Expertise: Drosophila Melanogaster, genetics Affiliation History:

1998-2002: University of Hoboken

2002: University of New Jersey

Publications:

As first author:

John Smith. History of the fruit fly. Journal of fruit fly. Volume 2. pp 17-25. 2002. University of Hoboken.

J Smith. Fruit fly genetics. Journal of fruit fly. Volume 2. pp 34-100. 1998. University of New Jersey.

As co-author:

Harvey Wallingford, John Smith. Fruit fly oncology. Journal of fruit fly. Volume 1. pp 99-101. 1999. University of Hoboken.

FIGURE 12

SYSTEM AND METHOD FOR MATCHING AND ASSEMBLING RECORDS

FIELD OF THE INVENTION

The present invention generally relates to data integration systems. More particularly, the invention concerns a system and method for identifying similarities and differences between different data.

BACKGROUND OF THE INVENTION

The Information Age brings with it new terms, such as "information overload" and "data overload." The Internet, and other sources, now provides an almost endless amount of text, or data on virtually any subject. The problem then becomes one of data management: how to organize the data in a meaningful way. Depending upon the requirement, the data may be organized based on any number of different criteria, with the number of different organizational criteria only limited by the number of different requirements.

Conventional methods for organizing data in the form of references usually match the references from multiple sources and then combine them. However, this method results in a data integration problem. This is because conventional matching techniques depend on the existence of a common referenced identifier, such as the name of a person, in the records being matched before using various techniques to determine whether the two records refer to the same entity.

Generally, record linkage techniques assume the existence of common explicit identifiers, particularly names, and the techniques then focus on trying to match one named record in one database to another similarly named record in another database. However, if the different records refer to an implicit entity, these techniques are not effective. For example, references citing the same publication in different records do not have an explicit identifier. Additionally, conventional record linkage techniques are poorly suited for matching records that are derived from conventional information extraction methods.

Therefore, there exists a need for a system and method for organizing data in a reliable and effective manner.

SUMMARY OF INVENTION

In order to overcome the deficiencies with known data organization systems, a method and system for matching and assembling data is provided. Briefly, the present invention can organize data even when the data is not structured, or when parts of the data are unidentified, or when there is no common identifier between different pieces of data. One embodiment of the present invention can overcome missing or inaccurate information in the original data sources, and can even handle optical character recognition errors resulting from inaccurate document scanning.

Briefly, one embodiment of the present invention comprises a method for organizing data that is comprised of a plurality of records that contain at least one field. Similar records are matched, and a new record is assembled, with the new record including parts of the matched records. The new records are then matched. This process may be repeated several times.

One feature of the present invention is that the new record may contain data that is a combination of various elements of the different fields of the matched records. Another feature of the present invention is that inferred data may be added to the new records, where the inferred data is obtained during the matching process.

These and other features and advantages of the present invention will be appreciated from review of the following detailed description of the invention, along with the accompanying figures in which like reference numerals refer to like parts throughout.

BRIEF DESCRIPTION OF THE DRAWINGS

FIG. 1 is a list of citation records to be assembled according to the methods of the present invention;

FIG. 2 is an assembled citation of the list provided in FIG. 1;

FIG. 11 is a list of citation records to be assembled according to another method of the present invention; and FIG. 12 is a complete "expert profile" of an author using the list provided in FIG. 11.

Figure 3:
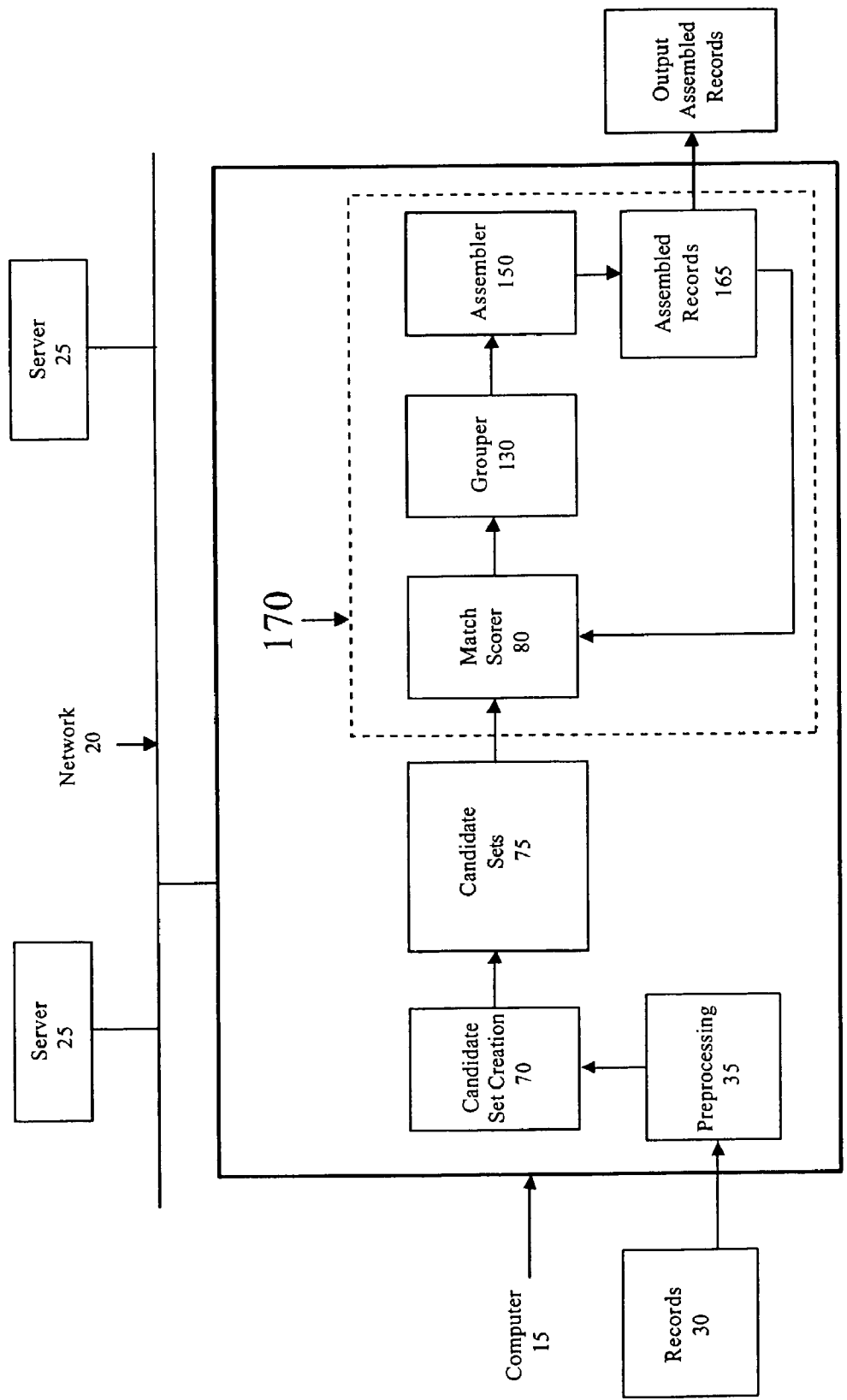
FIG. 3 is a flow diagram of a system for assembling records constructed in accordance with one embodiment of the present invention.

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Briefly, one embodiment of the present invention comprises a method for assembling data that is comprised of a plurality of records that contain at least one field. Similar records are matched, and a new record is assembled, with the new record including parts of the matched and assembled records. The new records are then matched. This process may be repeated several times. One feature of the present invention it that it can organize data even when the data is not structured, or when parts of the data are unidentified, or when there is no common identifier between different pieces of data.

To aid in the description of the present invention, a set of definitions is now provided. Unless defined otherwise, all technical and scientific terms used herein have the same meaning as is commonly understood by one of skill in the art to which this invention belongs. In event the definition in this section is not consistent with definitions elsewhere, the definitions set forth in this section will control.

As used herein, "data" refers to information in any form. For example, data may be factual information, or a general expression of information, or a gathered body of facts (such as a publication), or information that has been translated into a form that is more convenient to move or process (such as information obtained or inferred after one or more method steps of the present invention).

As used herein, "record(s)" refers to a data type containing one or more fields. For example, a record might be a publication reference, where the fields might be author name, publication title, journal name, and year of publication.

As used herein, "field(s)" refers to a component of a record that refers to a particular type of data. For example, an author name, a publication title, a journal name, a year of publication are all fields.

As used herein, "multidimensional record(s)" refers to a record with more than one field.

As used herein, "heterogeneous record(s)" refers to a record that has different structure or content format. For example, publication data obtained from a publication describing an invention would have different structure and/or content from patent data obtained from a patent for the invention issued to the author of the publication.

As used herein, "like field(s)" refers to a field found in different records that contains the same type of information. For example, the inventor name field of a patent record and the author name field of a publication record are like fields, when the author is also the inventor.

As used herein, "matching" refers to a technique of the present invention that determines whether two records refer to the same entity. For example, whether two references in two different publications are the same. One method of matching of the present invention may create a match by analyzing a set of fields in a group of records, and infer a match even when there is no explicit common identifier between the fields or records.

As used herein, "assembly" refers to a technique of the present invention where matched records are combined to create a new record with additional inferred data. For example, one method of "assembly" of the present invention may comprise generating a new record, one type of which is called an expert profile, of an individual. Data on the individual may be obtained from a number of publications authored by the individual, and the expert profile would be created by sometimes adding additional inferred data, such as the affiliation history of the individual.

As used herein, "inferred" data is data that is generated by deriving conclusions that are not explicit in the analyzed data.

As used herein, "classification" and "categorization" refer to a method of assigning entities into two or more classes or categories.

As used herein, "clustering" refers to a method of partitioning a set of entities into different groups.

As used herein, "metadata" refers to new data that is about old data. The new data contains new meaning, information or other knowledge about the old data.

As used herein, "heuristic" pertains to the process of gaining knowledge or some desired result by intelligent guesswork rather than by following some pre-established formula (in this case, heuristic can be contrasted with algorithmic). For example, "heuristic" describes an approach to learning without having a hypothesis or way of proving that the results proved or disproved the hypothesis. That is, "seat-of-the-pants" or "trial-by-error" learning. As used herein, "heuristic" pertains to the use of knowledge gained by experience (i.e., "using a rule-of-thumb"). As a noun, "a heuristic" is a specific rule-of-thumb derived from experience.

As used herein, "heuristic rules" refers to specific rules-of-thumb derived from experience and empirical data.

As used herein, "canonical form" refers to the most descriptive and complete description of an entity that may have many different ways of being described. For example, John Walter Smith is the canonical form of the name variants: J. W. Smith; John W. Smith; John Smith; or J. Smith.

As used herein, "cascade" refers to a repetition of one or more steps.

As used herein, "common identifier" refers to the existence of a common element between two or more records. For example, citations obtained from different sources may all have the name of the primary author.

As used herein, "parsing" or "rule-based parsing" refers to the process of separating a record, or multi-component field down into its component parts. For example, a "parsed" multi-component name field is comprised of sub-fields that include a first name, a middle name, and a last name.

One problem associated with modern-day data management is one of data integration. That is, how to integrate, organize and represent data in a new and meaningful way. Generally, conventional data integration techniques use record linkage methods that focus on a narrow range of specific and well-defined types of record fields, particularly standard names, addresses and generic strings and numbers. These record linkage methods generally use field-to-field matching techniques. However, most records are not organized into well-defined record fields, and different publications, or other forms of data, are not organized consistently. Conventional data integration methods fail in the face of this imperfect or imprecise data. Moreover, true data assembly is missing from conventional record linkage methods.

For example, some requirements for modem-day data integration are: profiling entities such as people, institutions and products; reference resolving; record matching; database cleansing (such as duplicate removal); and integrating distinct data sources. Profiling is the process of assembling and creating detailed profiles of key entities such as people, institutions, and products. Reference resolving is the process where bibliographic references obtained from different sources are matched to references citing the same material and then assembled to create the most complete reference citation. Record matching is the process where two or more records obtained from different data sources are matched if they refer to the same item. Duplicate removal is the process of identifying whether a data source contains more than one element of the same entity and then removing the duplicates once identified.

Therefore, a need exists for a method for assembling multidimensional and/or heterogeneous records that can be applied to records even when the records are not necessarily structured, or when fields are unidentified or unaligned, or when there is incomplete or inaccurate data, or when there is no common identifier between the records being matched.

The present invention provides a general-purpose data organization and/or integration method that transcends simple field to field matching and which provides a framework for applying other domain-specific techniques that go beyond the treatment of standards fields. One feature of the present invention uses information inferred from the actual assembly of the matched records in order to refine the matching process. The present invention provides a general framework for matching records and then provides true assembly of matched records that may also infer new data from the matching process.

One embodiment of the present invention matches records that may refer to the same entity (such as an individual) and then assembles a new record that is a combination of some or all the elements of the different fields of the matched records, as well as new inferred data.

Another embodiment of the present invention comprises a method that matches, groups and assembles records in a series or group of steps (a cascade), where in each cascade step the process of matching and assembly is further refined as a consequence of information inferred from earlier steps.

A preferred embodiment of the present invention comprises a system for matching and assembling two or more multidimensional records that may represent the same entity or may refer to a specific entity of interest, even in the face of errors in the data.

Referring to FIG. 1, a group of records in the form of publication citations is listed, and is provided as an illustration of one type of problem solved by the present invention. In this example, the goal is to match the records and assemble a new canonical citation that incorporates the relevant sections of the provided records.

Each of the five records includes a number of different fields 10. For example, record (1) includes a field 10 that has a typographical error, "C Runciman & amp" and a field 10 of "D Wakeling." Record (4) includes a field 10 comprising "Heap profiling of lazy functional programs." Record (5) includes a field 10 of "April 1993." As can be seen from the five different records, the authors' names are presented in different formats and locations. In addition, the publication (Journal of Functional Programming) is spelled out in its entirety in some of the records, but in record (3), the publication is abbreviated. Moreover, the title of the publication article (Heap profiling of lazy functional programs) is positioned in different locations within each record and in record (5) the title is listed incorrectly.

Conventional record matching methods that simply perform field to field matching would not be able to provide an accurate canonical citation because of the errors presented in the different records as well as the different locations of corresponding fields 10.

However, as illustrated in FIG. 2, one embodiment of the present invention assembles a canonical citation that provides complete author names, as well as the article title, publication name, location of the article within the publication and the publication date.

Referring to FIG. 3, a flow diagram of a preferred embodiment of the present invention is provided. This embodiment of the present invention can assemble multidimensional and heterogeneous records through a repeating set of any one of, or a combination of, matching, grouping and assembly steps.

A preferred embodiment of the present invention is software that comprises machine-readable code for a general-purpose digital computer. One embodiment of the present invention may be constructed to operate on a "personal" computer, and other embodiments of the present invention may be constructed to operate on a computer server that would provide access to the invention software from multiple computers, or the Internet. The present invention may be implemented in various forms of computer hardware, software or combinations thereof.

As shown in FIG. 3, the flow diagram depicts several software modules shown as individual blocks. Each module comprises on or more machine-readable instruction sets. It will be appreciated that the function performed by the individual modules may be combined into a single module, or into other combinations of modules.

As discussed above, the software comprising the invention may be stored on a computer 15 that may be accessible over a network 20, or may be stored on one or more servers 25 that also are accessible over the network 20. As defined herein, a network 20 is a group of points or nodes connected by communication paths. The communication paths may be connected by wires, or they may be wirelessly connected. A network 20 as defined herein can interconnect with other networks and may contain subnetworks. A network 20 as defined herein can be characterized in terms of a spatial distance, for example, such as a local area network (LAN), a personal area network (PAN), a metropolitan area network (MAN), and a wide area network (WAN), among others.

To provide an overview, a preferred embodiment of the present invention will be described with reference to FIG. 3. First, a plurality of records 30 are provided, with each record 30 containing at least one field 10. Next, a preprocessing module 35 processes the records 30. The various preprocessing steps may include parsing the records 30 into fields 10, and labeling unlabeled fields 10.

Once that is done, this specific embodiment of the invention then creates candidate sets 75 by way of the candidate set module 70. Generally, candidate set 75 creation saves time. This feature of the invention does not compare every record 30, thereby saving processing time. The candidate set module 70 creates candidate sets 75 that are comprised of groups of records 30. The records 30 in these candidate sets 75 are compared to each other within these sets. For example, one rule used by the candidate set module 70 uses an author's last name and first initial to place records 30 into a candidate set 75.

Next, the match scorer module 80 compares the records 30 within a candidate set 75 to determine if the records 30 match. In a preferred embodiment match scorer module 80, field matching is used to compare individual fields 10 of two records 30. Match scores 95 are generated during the field matching process. One feature of the present invention is that co-author names are used to match records 30.

Once match scores 95 have been generated, the grouper module 130 continues the processing. In a preferred embodiment of the present invention, heuristic rules are used to determine from the individual field match scores 95 whether two records 30 being compared are a match. One example of a heuristic rule used by the present invention is to add all the individual match scores 95. More complex heuristic rules will be described in detail below. One feature of the present invention is that these heuristic rules may be changed based on what type of records 30 are being compared and at what stage of the processing cascade. The output from the grouper module 130 are groups of records 30 that are ready for assembly by the assembler module 150.

The assembler module 150 takes each group of records 30 and outputs new assembled records 165. For example, "expert profiles" may be created, containing a variety of information relating to a single author. Another type of new record created by the assembler module 150 may be the creation of a complete citation record. In addition, the assembler module 150 may infer new data, known as metadata. For example, an affiliation history profile may be created, or a canonical authors name may be created, or a canonical institutional name may be created using metadata.

The assembled records 165 may be output, or they may be processed again, returning to the match scorer module 80, or the grouper module 130. The process of analyzing records 30 through the match scorer module 80, the grouper module 130 and the assembler module 150 is called a Cascade, or cascade stage 170. One feature of the present invention is that the new assembled records 165 may be processed through repeated cascade stages 170. One factor that determines the number of cascades 170 is the type of data that is being analyzed. One feature of the present invention is that the number of cascades 170 can be set in advance, or the cascade 170 may be stopped if no more new assembled records 165 are being created.

Again referring to FIG. 3, one or more records 30 are collected and forwarded to the preprocessing module 35. As defined above, the records 30 may be comprised of any type of data that contain a specific number of fields 10. For example, a record 30 might be a publication reference, where the fields 10 might be author name, publication title, journal name, and year of publication. Other examples of records 30 include patents, articles and any other collection of data that includes fields 10 as defined above.

The preprocessing module 35 analyzes the records 30 to determine if the fields 10 within each record 30 are in a form suitable for subsequent processing by the succeeding steps of the present invention.

Figure 4:
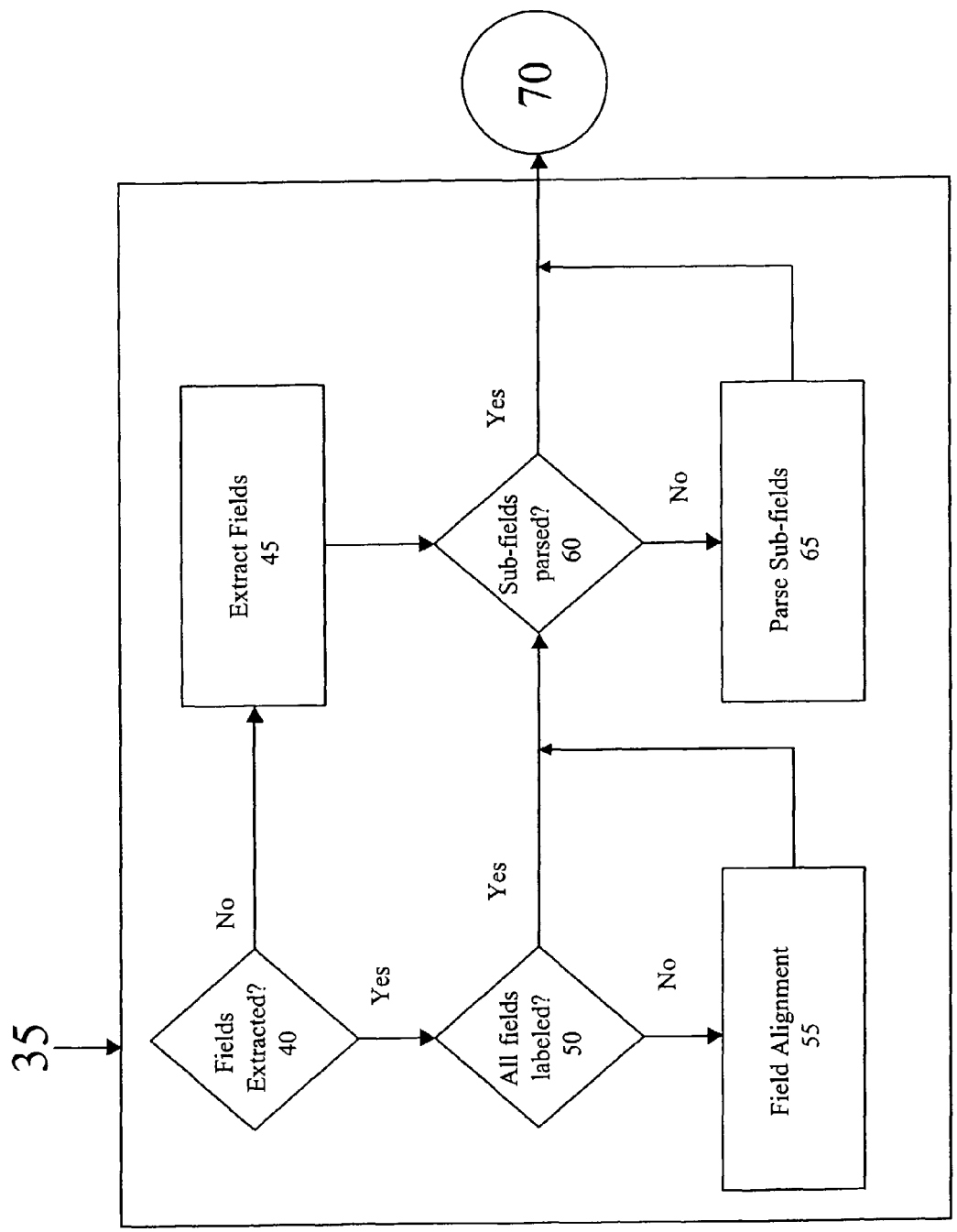
FIG. 4 is a flow diagram of a data preprocessing method constructed in accordance with one embodiment of the present invention.

Referring to FIG. 4, the preprocessing module 35 comprises several steps. First, in step 40, a determination is made regarding whether the fields 10 have been extracted from a record 30 of interest, known as a "source" record. In many instances, fields 10 are embedded and are difficult to identify, requiring extraction. For example, the records 30 may consist of citations that are embedded in a publication document. The present invention identifies these citations, extracts them and then creates citation records. A rule-based parser may be employed to perform this function in field extraction step 45.

In other instances, the existing fields 10 in the source record may not have been completely parsed, or broken down into their component parts and labeled. For example, a field 10 may be labeled "name" but the sub-fields comprising the individual name components such as first name, middle name, and last name have not been parsed out. In that instance, the fields 10 are processed by using a rule-based parser to extract the component sub-fields in step 65.

For example, a record 30 may just identify the author name as Albert E. Einstein. The present invention breaks down this record 30 into sub-fields such as first name, middle name and last name.

And in other instances, not all the fields 10 in the source record have been labeled. For example, the "journal name" field 10 may be labeled, but other fields 10 such as author name and co-author names may not be labeled. For example, consider the author name Taylor D. W. Wilson. Is this the case where the author is "Taylor D. W. Wilson", or are there really two authors, a "Taylor, D." and a "Wilson, W." Perhaps, during the OCR process the initial of the author was missed. One embodiment of the present invention may postulate both scenarios as plausible, and then identify another citation record that matches this citation and if the name fields in that citation are properly labeled, use those labels to infer which scenario is correct.

In this case, the field alignment step 55 is employed to label unlabeled fields. This process comprises finding a "matching target" record that has been labeled in its entirety. A matching target record is one that has a high score when compared to the source record. When evaluating matches, the present invention generates a numerical score normalized between zero (0) and one (1). The value of the score obtained determines whether the match is valid or not.

What determines a high score is derived from empirical analysis of the data being organized.

Once a matching target record has been found, the field alignment step 55 then pairs off labeled fields 10, if any, between the matching target record and the source record. The field alignment step 55 then compares pair-wise the unlabeled fields 10 of the source record with the unpaired fields 10 of the matching target record. The field label in the matching target record for which the match score is the highest is used to label the unlabeled field 10 of the source record. When the field alignment step 55 is complete all the fields 10 in the source record are labeled.

Referring to FIG. 3, the next step of the present invention is illustrated. The candidate set creator 70 partitions the records 30 into groups, known as candidate sets 75, for subsequent processing according the method of the present invention. The goal of this step is to reduce the computer computation requirements used during subsequent steps. The candidate set creator 70 employs rules that are dependent on the nature of the records 30 being grouped. What types of records 30 are being organized determines what rules for candidate set 75 creation to apply. For example, when creating an "expert profile" from publication citations, the field 10 being used to group records 30 are the primary author names. In that instance the present invention may employ a rule that uses the author's last name and the first letter of the author's given name to group possible records 30 for assembly. In another example, such as when creating candidate sets 75 for institutional profiles, the present invention may use the proper noun within the institution name to group possible records 30 for assembly. In this example, "Parity Computing," "Parity Solution" and "The Parity Enterprise" will be in one candidate set 75 while "Varity Computing" and "Varity Solution" would be in another candidate set 75.

To further explain, if the records 30 are citations then the candidate set creator 70 groups all the authors with the same last name and first initial into their own discrete candidate set 75 for subsequent processing. It will be appreciated that other rules used to group the records 30 may be employed. For example, a candidate set 75 may contain only records 30 that have the same last name and the same first initial. Or, a candidate set 75 may contain only records 30 that contain similar journal names. Another embodiment of the present invention may use additional fields 10 to further refine the candidate set 75 creation process.

The candidate sets 75 comprising groups of records 30 are then individually processed according to the subsequent steps of the present invention. As shown in FIG. 3, each candidate set 75 is processed by the match scorer module 80.

Figure 5:
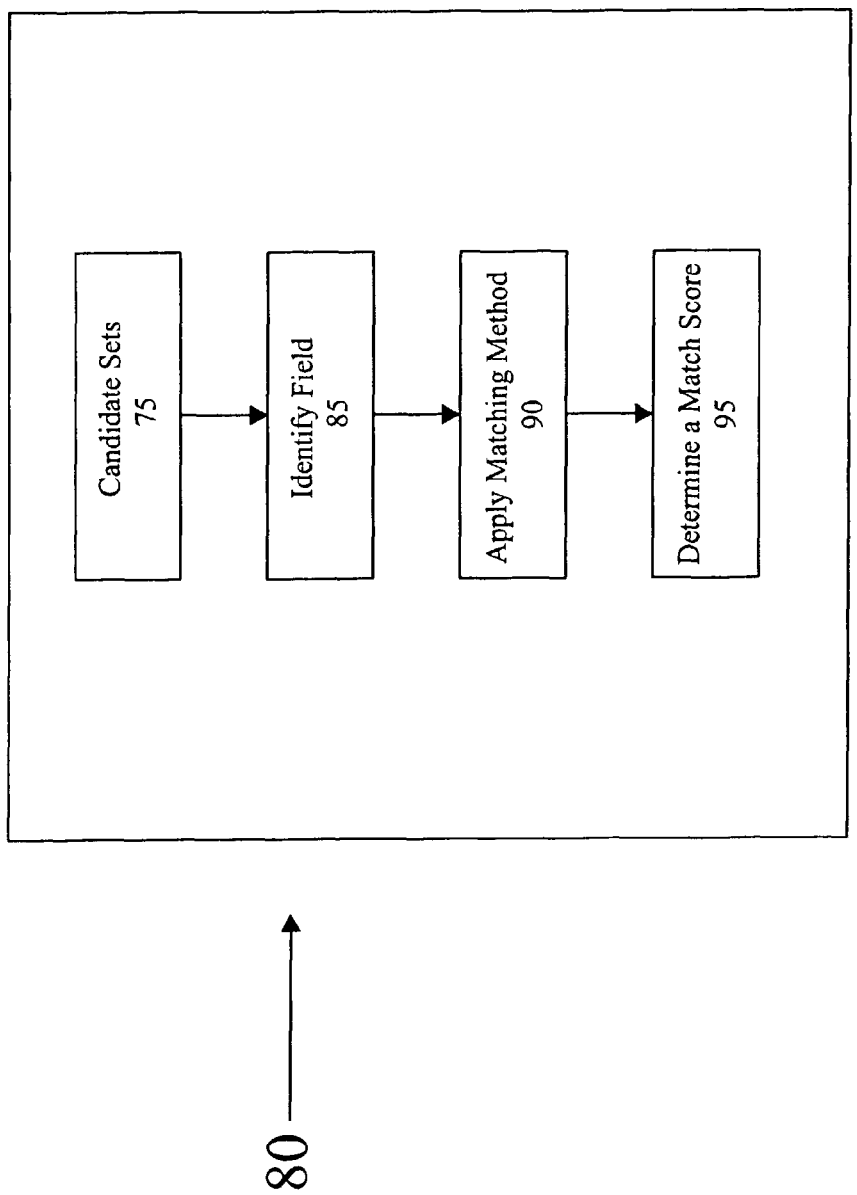
FIG. 5 is a flow diagram of a match scorer method constructed in accordance with one embodiment of the present invention.

Referring now to FIG. 5, the match scorer module 80 compares corresponding fields 10 of all the records 30 in the candidate set 75. The comparison of the corresponding fields 10 is performed "pair-wise." That is, two corresponding fields 10 are compared to each other. Put differently, pair-wise comparisons are performed between all the records 30 in the candidate sets 75. Other comparison groupings may also be employed, such as a comparison of three, or more corresponding fields 10, or records 30.

The first step of the match scorer module 80 is field identification 85. The field identification step 85 identifies the type of field 10. For example, field 10 types may be publication, article title, author, and date of publication. It will be appreciated that other field 10 types exist, and the foregoing list is meant to be exemplary, and not exclusive.

The match scorer module 80 then employs a matching method 90 to the paired fields 10. One aspect of the present invention is that different matching methods 90 are used based on the field 10 type. In addition, one embodiment of the present invention also uses specific types of matching methods 90 depending on the cascade 170 stage. This aspect of the matching method 90 will be discussed in further detail below, in connection with FIG. 6.

The matching method 90 determines a match score 95. Match scores 95 may be numeric or Boolean. For fields 10 that contain general-purpose strings such as an article abstract, the match scorer 90 may employ a vector space matching method. This method determines the similarity between two text strings by first representing the text strings in a vector space model and then comparing the spatial proximity of the vectors representing each text string in the model. The present invention may use several methods for computing the spatial proximity of the vectors, such as the Cosine, Dice and Jacquard similarity models. The nature of the data being evaluated dictates which vector space matching method should be employed. Generally, a vector space model is a text string representational model where a text string is represented in a high-dimensional space, in which each dimension of the space corresponds to a word in the text string. Therefore, a vector in this space can represent each text string.

For non-numeric fields 10, combinations of distance metrics such as edit distance methods are used to obtain a match score 95. Distance metrics are a class of rules and methods that are used to determine the similarity between two entities. The vector space matching method and edit distance matching method are examples of distance metrics.

The present invention also employs other methods to obtain a match score 95 of numeric fields 10. For example, match scores 95 may be obtained through comparing either absolute or relative differences between two numeric entities. As an example, if 160 is being compared to 200, the absolute difference is (200−160)=40, and the relative difference is (200−60)/200=0.7

For non-numeric fields 10, such as journal name, publisher name, co-authors, etc., specialized match scoring rules have been devised. It will be appreciated that the list of non-numeric fields 10 is extensive, and the above-listed non-numeric fields 10 are meant to be exemplary, and not exclusive.

Figure 6:
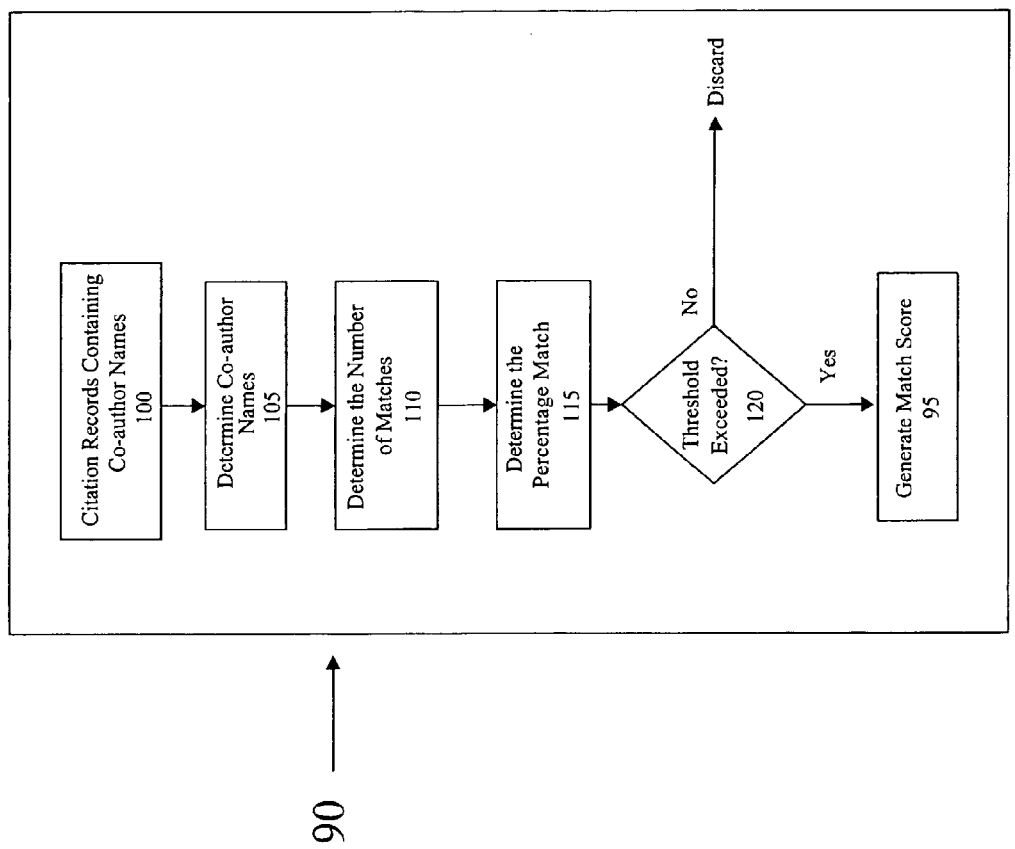
FIG. 6 is a flow diagram of a matching method constructed in accordance with one embodiment of the present invention.

One embodiment of the matching method 90 to obtain match scores 95 of the present invention is illustrated in FIG. 6. In this example, the matching method 90 is preformed to determine a co-author name. In step 100, the citation records 30 containing author and co-author names are obtained. In step 105, the co-author names are determined. To perform this step the present invention obtains the fields 10 containing the co-author names and they are "paired off" in order to perform a pair-wise comparison.

The number of matches obtained during the pair-wise comparison is determined in step 110. A match is found when two names are compatible. A compatible name is where one name is can be considered to be a variant of another. For example, John W. Smith is compatible with J. Smith but not compatible with John T. Smith. That is, J. Smith is a variant of John W. Smith, but John T. Smith is not a variant of John W. Smith.

In step 115, the match percentage is determined. The match percentage is determined by calculating what percentage of co-authors is common to the two records 30 being compared.

After the match percentage is determined, it is compared to a threshold value in step 120. One aspect of the present invention is that the threshold value is changed, depending on what stage the overall data assembly method is in. That is, the present invention repeats some steps and at a first pass, the threshold value may be lower, but as steps are repeated, the threshold value will increase.

If the match percentage exceeds the currently set threshold value, then the record 30 containing the field 10 that met the threshold value is given a match score 95, and is passed onward for further processing. However, if the match percentage does not meet the currently set threshold value, then the record 30 containing the specific field 10 that failed to meet the threshold value is discarded.

Figure 7:
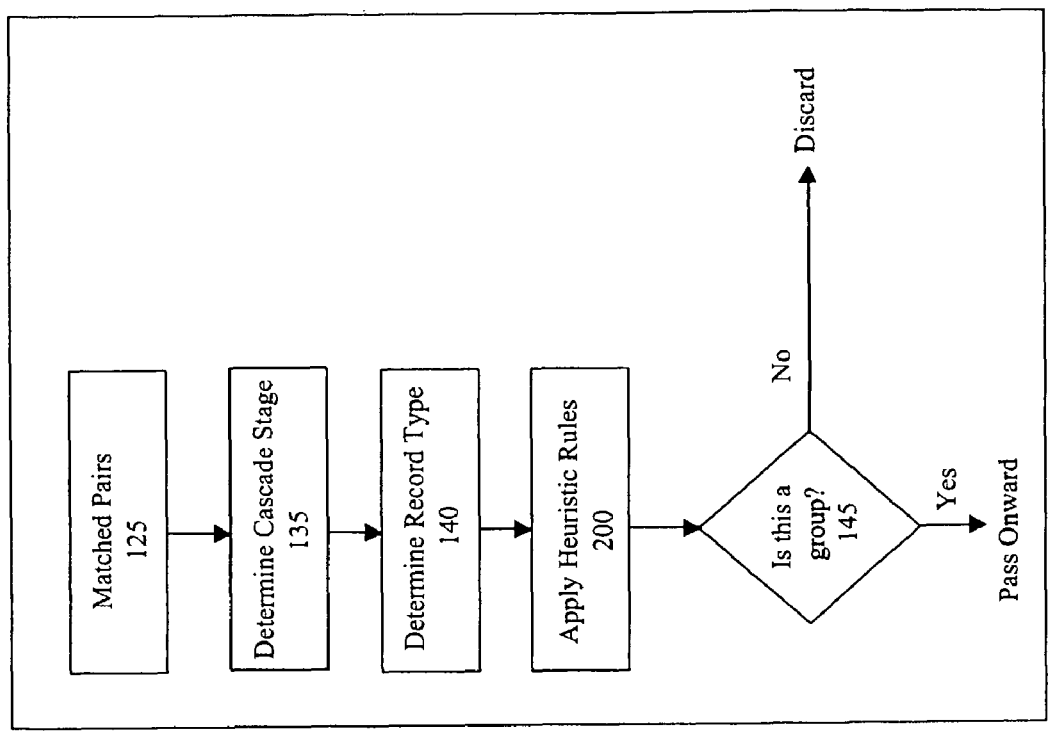
FIG. 7 is a flow diagram of a grouping method constructed in accordance with one embodiment of the present invention.

Referring to FIG. 7, once the matching method 90 has been completed, the remaining matched pairs 125 of records 30, that consist of pairs of either fields 10 or records 30, are then grouped using a grouping method 130. The grouping method 130 of the present invention employs a set of heuristic rules 200 that depend on the cascade stage 135 and record type 140. This will be explained below with reference to FIG. 8. Once the heuristic rules 200 have been applied, an evaluation step 145 determines if the pair of records 30 are candidates for grouping. The output of grouping method 130 is a set of groups that contain records 30 that will be subsequently assembled. It will be appreciated that other heuristic rules 200 may be applied at other times during the data assembly method described herein.

The grouping method 130 of the present invention groups the records 30 together for assembly into a more complete record 30. For example, during the creation of an "expert profile" of an author, if two authors were identified by their match scores 95 during the matching method 90, the grouping method 130 may create a new target expert that combines and assembles the fields 10 of the two author's records 30. One feature of the grouping method 130 of the present invention is that it takes into account the match scores 95 generated in the matching method 90 and postulates candidate groups by a set of rules that make use of the match scores 95. In a preferred embodiment of the present invention, the rules are modified at each cascade 170 and take into account new information obtained by prior cascades 170. Cascading 170 will be discussed in detail below.

Figure 8:
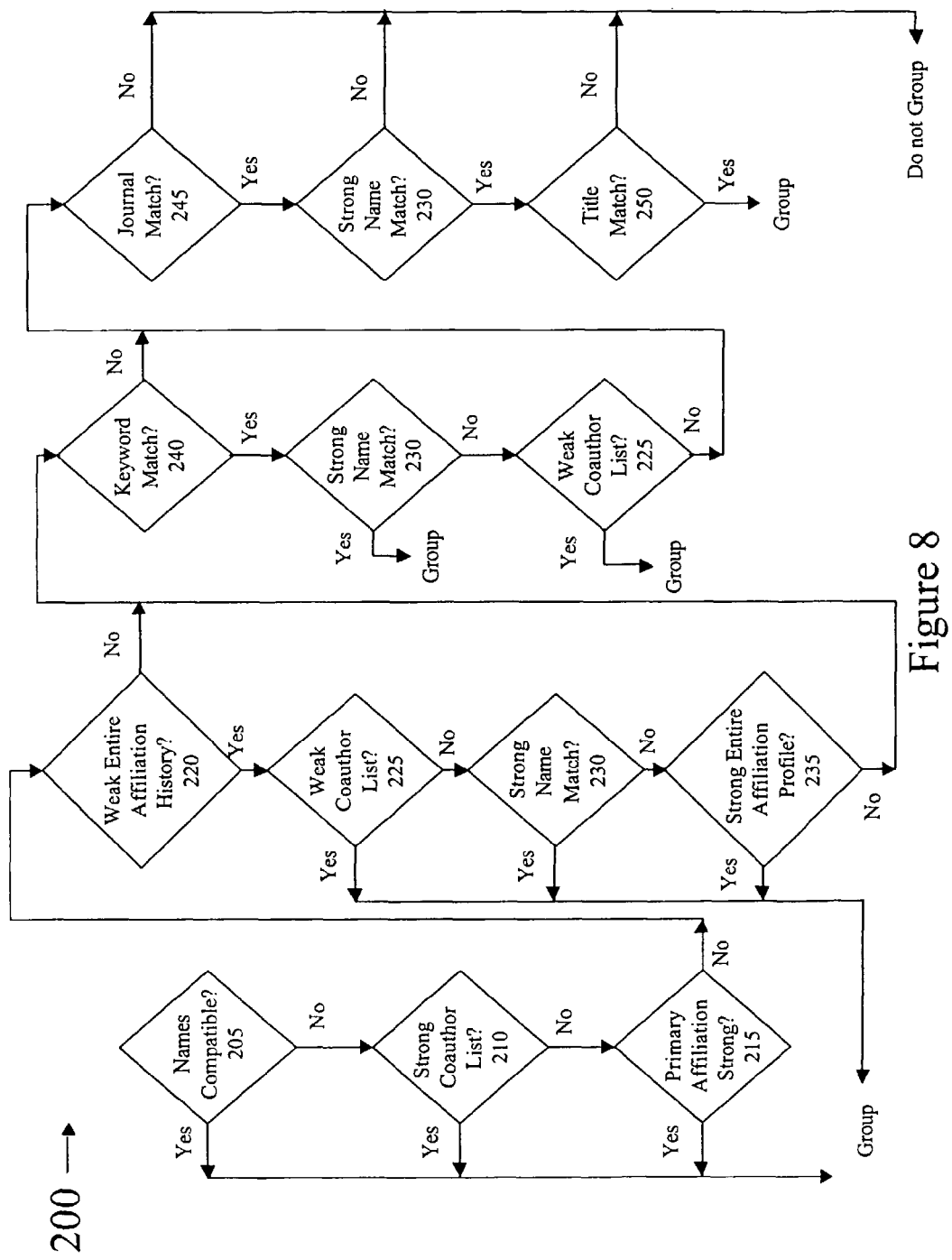
FIG. 8 is a flow diagram of a set of heuristic rules constructed in accordance with one embodiment of the present invention.

Referring now to FIG. 8, a flow diagram is presented, illustrating one type of grouping method employing one set of heuristic rules 200 of the present invention. One feature of the computer software constructed according to present invention is that it uses heuristic rules 200 that employ specific rules-of-thumb derived from experience and empirical data. That is, the software constructed according to the present invention achieves a desired result (in this case, grouping data relating to an author) by intelligent guesswork rather than by following some pre-established formula.

For example, the flow diagram of FIG. 8 illustrates that the heuristic rules 200 used to group the data of interest evaluates "strong" lists and "weak" affiliations. However, the definition of "strong" and "weak" change with each stage of data analysis. That is, one feature of the present invention is that as the data analysis is repeated, in successive cascades 170, the definition of "strong" and "weak" changes, thereby changing the ultimate data output.

The terms "strong" and "weak" are used to evaluate the match scores 95 when two fields 10 are compared. When the match score 95 of two fields 10 being compared is high, the fields 10 are considered to be "strongly" compatible and if the score is low, the fields 10 are considered to be. "weakly compatible. What is a high match score and what is a low match score changes with the cascade 170. The actual values are determined a priori from empirical analysis of the data being organized. Generally, match scores 95 are normalized between 0 and 1. Thus, a value closer to 1 is "strong" and a value closer to 0 is "weak." For example, in the case of compatibility of two co-author fields 10, the present invention determines that 0.8 is a "strong" compatibility and 0.2 is a "weak" compatibility. However, these numbers may be changed during subsequent cascades 170.

It will be appreciated that other heuristic rules 200 constructed according to the present invention exist, and the sample illustrated in FIG. 8 is exemplary, and not exclusive.

FIG. 8 describes a set of heuristic rules 200 for that may be used to determine whether data in the form of two records 30 can be grouped for assembly into an "expert profile." In this case, the "expert profile" contains information relating to an author, such as his/her full name, where he/she currently works (primary affiliation), where he/she has worked in the past (entire affiliation), the names of any co-authors, the names of the journals that the author has been published in, and the titles of any papers published by the author. An example of an expert profile is illustrated in FIG. 12. Other types of profiles may be assembled, containing other types of information. For example, other profiles may comprise institution profiles, drug profiles, product profiles, and invention profiles.

The first step 205 of the heuristic rules 200 determines whether the names present in the two records 30 are compatible. As discussed above, a compatible name is where one name is can be considered to be a variant of another. For example, John W. Smith is compatible with J. Smith but not compatible with John T. Smith. If the names in the two records 30 are compatible, the two records 30 are grouped and processing terminates. If the names in the two records 30 are not compatible, the two records 30 cannot be grouped and processing continues.

In step 210, the software checks to see if the co-author list contained in the two records 30 is "strongly" compatible. If yes, the two records 30 can be grouped and processing terminates. If no, the two records 30 cannot be grouped and processing continues.

In step 215, the software checks to see whether the primary affiliation histories are "strongly" compatible. If the primary affiliation histories of the two records 30 are "strongly" compatible, the two records are grouped. If no, the two records 30 cannot be grouped and processing continues.

In step 220, the software checks to see if the entire affiliation history is "weakly" compatible. If the entire affiliation histories of the two records 30 are "weakly" compatible, the two records 30 are grouped, IF ANY ONE OF steps 225, 230 or 235 is true. Therefore, the software determines: 1) if the co-author list of the two records 30 is "weakly" compatible (step 225); or 2) if the author names of the two records 30 match "strongly" (step 230); or 3) if the entire affiliation profile matches "strongly" (step 235).

If any one of steps 225, 230 or 235 is met, or held to be true, then the two records 30 can be grouped and processing terminates.

However, if none of steps 225, 230 or 235 are true, then in step 240 the software checks to see if the keywords associated with each author exceeds a certain threshold value. In a preferred embodiment of the present invention, threshold values are determined empirically, but alternative embodiments may use specifically defined threshold values. Keywords are words and phrases that aid in describing what the entity is. For example, in the case of a medical "expert profile," keywords may be medical words and phrases.

In step 240, if the keywords associated with each author do exceed the set value, then the two records 30 are grouped, IF ANY ONE of the following rules holds: 1) the author names match "strongly" (step 230); or 2) the co-author list matches "weakly" (step 225). The analysis performed in these two steps is the same as described above.

However, if none of steps 230 or 225 are true, then in step 245 the software checks to see if there is a match of journal names associated with each author. If no journal names match, the two records 30 cannot be grouped and the processing terminates.

If the journal names do match, then the two records 30 will be grouped, IF BOTH of the following rules holds: 1) if the author names are "strongly" compatible (step 230); and 2) if the article titles of all articles authored by the author exceeds a defined threshold (step 250).

If BOTH steps 230 and 250 are met, then the two records 30 are grouped and the processing of the data continues on to the next stage. In all other cases, the two records 30 cannot be grouped and processing terminates for those two records 30.

In addition to the above-described grouping method 130, the present invention may use additional evidence for plausible groups by classifying the records 30 into a pre-existing ontology that has been defined to reflect the nature of the records 30 being assembled. As used herein, "ontology" is a set of concepts-such as things, events, and relations—that are specified in some way (such as specific natural language) in order to create an agreed-upon vocabulary for exchanging information.

Grouping suggested by the ontological classification is used to modify the grouping method 130 for more accurate determination of the groups. For example, a pre-existing ontological classification may be the MesH ontology created by the National Library of Medicine or the UNSPSC (United Nations Standard Products and Services Code) ontology that is used to categorize and identify products and services.

In a preferred embodiment of the present invention, the ontological classification stage is repeated at each cascade 170.

Figure 9:
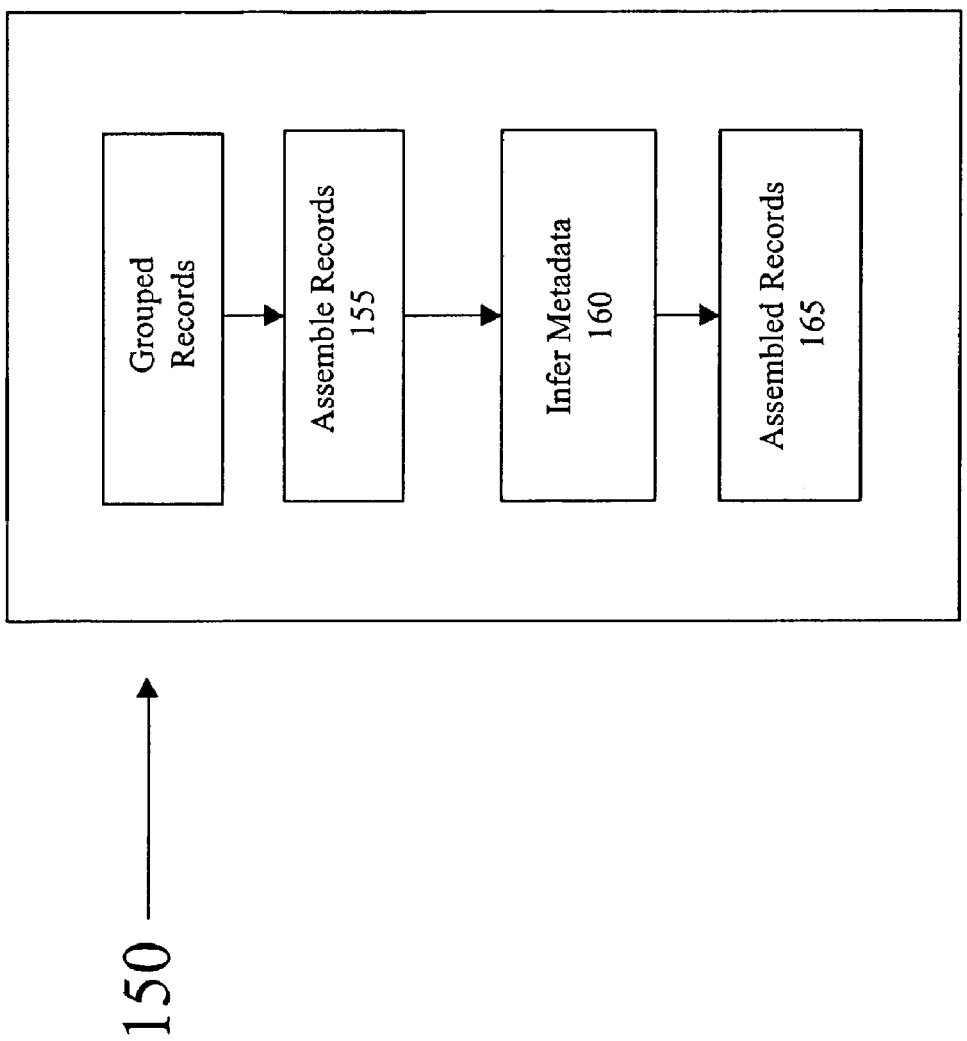
FIG. 9 is a flow diagram of an assembly method constructed in accordance with one embodiment of the present invention.

Referring to FIG. 9, the input to the assembler module 150 are the groups as produced by the grouper module 130. Once matched groups have been created, the assembler module 150 then assembles the individual records in a group and creates new records. One feature of the present invention is that during this process, additional inferences are drawn a consequence of the assembly. For example, the assembler module 150 may create a more complete affiliation history profile by combining the individual affiliation records in a publication record. The present invention may also infer metadata relating to a particular author by combining the keywords from the individual publication records.

A preferred embodiment of the assembler module 150 constructed according to the present invention posits canonical forms of fields 10 being merged. For example, if two authors being assembled had the names J. W. Smith, and John Smith, then the canonical name of the assembled author would become: John W. Smith. It will be appreciated that different field 10 combining techniques are also used to merge specific fields 10. For example, in the case of generating canonical institutional names, a rule might be to expand abbreviations. In this case, IBM is expanded to International Business Machines and that is determined to be the canonical form.

In step 155, the records 30 in each group are assembled into a composite record. A composite record includes components from one or more records 30. For example, the canonical citation illustrated in FIG. 2 is one type of composite record. It will be appreciated that composite records may take other forms, and include other types of data, depending on the type of data being assembled.

In step 160, the software constructed according to the present invention infers additional metadata obtained from the assembly step 155. As defined above, metadata is new data that is about old data. The new data contains new meaning, information or other knowledge about the old data. For example, all the publications by the same author may be assembled in order to create an expert profile. New metadata inferred might be the canonical name of the author, the affiliation history of the author, any publications written by the author, etc.

In step 165, after any additional metadata is inferred, the assembled records 30 are either output for actual end use, or the records 30 may go through another series of processing steps, or cascades 170. As shown in FIG. 3, one feature of the present invention is that the assembled records 165 may be re-processed several times in a cascade 170. One embodiment of a cascade 170 constructed according to the present invention comprises the match scorer module 80, the grouper module 130, and the assembler module 150.

Generally, the cascade 170 is used to increase the quality of the data assembly process. After a group of records 30 has made a "first pass" through the modules illustrated in FIG. 3, there may not have been enough information to group and assemble all the records 30 that actually should have been assembled. As a consequence of assembly, more information may have been obtained to infer better matches.

For example, during the process of creating expert profiles, if there are two expert profiles bearing the same name, the question as to whether these two experts are one-and-the-same is better answered when other data is analyzed. The analysis may ask: which journals have these experts been published in; and what are the subject areas of their publications. Therefore, if the two assembled profiles have significant assembled data in common, subsequent cascades 170 can create an assembled record 165 that will contain more information than obtained with only one "pass" through the modules.

In a preferred embodiment of the present invention, at each succeeding cascade 170 step, the heuristics previously applied for matching fields 10 are modified. Some heuristics are tightened while some heuristics are relaxed. This is because as more and more records 30 have been assembled, there is more information that allows the software of the present invention to determine which heuristics to apply and how to apply them.

For example, at each succeeding cascade 170, inferred data may suggest additional matches between records 30 or fields 10. For example, if an author affiliation history has been created, whether two authors are candidates for assembly can be determined from inspecting the compatibility in time and affiliations of the individual author's affiliation history.

In addition, during one embodiment of a cascade 170, the various value thresholds as discussed above may be adjusted. By adjusting these value thresholds, the quality of the data assembly is improved. Other values or thresholds may be adjusted, for example, the definition of "strong" or "weak" may be adjusted, which may result in higher quality data assembly.

In addition, one embodiment of cascading 170 may include the candidate set creator 70, as shown in FIG. 3. Generally, the number of cascades 170, or cascade stages is dictated by the nature of the records 30 being assembled. In some cases only one cascade 170 is sufficient and in other cases more than one cascade 170 is needed to properly assemble the records 30. One feature of the present invention is that during the cascading process, the present invention may modify both the match scorer module 80 and the grouping method 130. This is because as the cascades 170 progress, more information is obtained. The match scorer module 80 and the grouping method 130 may be modified by introducing new matching methods, new matching score evaluations, and new grouping rules.

For example, when an "expert profile" is being generated, a cascade 170 may use different methods to score co-author matches and affiliation matches. This is because the prior cascade 170 may have created a new set of co-author names, and the cascade 170 may need to evaluate the match scores 95 by looking at the new set of co-authors. The same situation may occur with affiliation history profiles.

For example, when the present invention is constructing an "expert profile," the following may be considered at cascade 170 stage 1: (1) Are the author names compatible? The last names must be the same, and the first names must be compatible (J is compatible with John, but Jim is not compatible with John). (2) Do the co-authors match? A match is ascertained if the score exceeds a certain value, as described above. (3) Do the affiliation profiles match? In cascade 170 stage 1, the present invention would only determine whether the authors in question had the same affiliation. At a later stage in the cascade 170, the present invention may look at the entire chronological history to determine where the two affiliation histories are compatible with respect to affiliations and time. One feature of the present invention is that it analyzes fields 10 in records 30 with respect to the date(s) that an author may be associated with a specific entity.

In a preferred embodiment of the present invention, the data in the records 30 may be cascaded 170 about four or five times, to achieve the highest-quality data assembly. Generally, the number of cascades 170 to apply is empirically determined. Usually, the present invention may have achieved a very high quality data assembly after about four or five cascades. The number of cascades 170 to apply can also be specifically defined so as to stop cascading 170 when no new assembled records 165 are being generated.

One feature of the present invention is that during a cascade 170, additional field 10 matching steps may be employed, or existing field 10 matching scores 95 may be modified (match scores are discussed above in connection with FIG. 6).

An example of using additional match scores 95 would be when a set of keywords are compiled for an author's expert profile in order to determine matches between different authors. The set of keywords may not have been usable at a first or second cascade 170. However, if the authors in consideration now have a number of publication records, then the aggregate of all the keywords from the individual publications can be used to determine a plausible match among the authors. In addition, different grouping rules may be used in succeeding cascade 170 stages. The rules might include the new field 10 match scores 95 introduced at this cascade 170 stage or might use different threshold values to compute match plausibility.

For example, different grouping rules employed in the grouping method 130 during a cascade 170 may include: If the author names are compatible but the co-author and affiliation history do not indicate a strong match (and do not indicate a mismatch), then if the keyword match scores exceed a specified value (only if the names are strictly compatible), then these two records 30 should be grouped. One rule for determining name compatibility is that the first names must be equal and not just compatible and middle names must be compatible.

One embodiment of the present invention may perform additional field 10 analyses in the match score module 80 during succeeding cascades 170. For example, the field 10 analysis may include the following: 1) If other components of names are compatible, are middle names/initials compatible? 2) What is the match score 95 of the affiliation profile where the expert was a first author? 3) What is the match score 95 of the affiliation profile where the expert was not a first author? 4) What is the match score 95 of the journals the experts write in? 5) What is the match score 95 of abstracts of papers published by this expert? 6) What is the match score 95 of titles of papers published by this expert?

In addition, one embodiment of the present invention may perform additional field 10 analysis in the grouping method 130 during succeeding cascades 170. For example, the field 10 analysis may include the following: If the names are compatible in all respects, then: 1) If the affiliation profiles are compatible, and there are no gaps larger than a specified number of years, indicate a match. 2) If the composite title match score exceeds a specified value, and the composite journal match scores exceed a specified value, then indicate a match. 3) If the composite journal match scores exceed a different (higher) specified value, then indicate a match. The values of the gaps are usually empirically determined, and the same holds for the title and journal match values.

Figure 10:
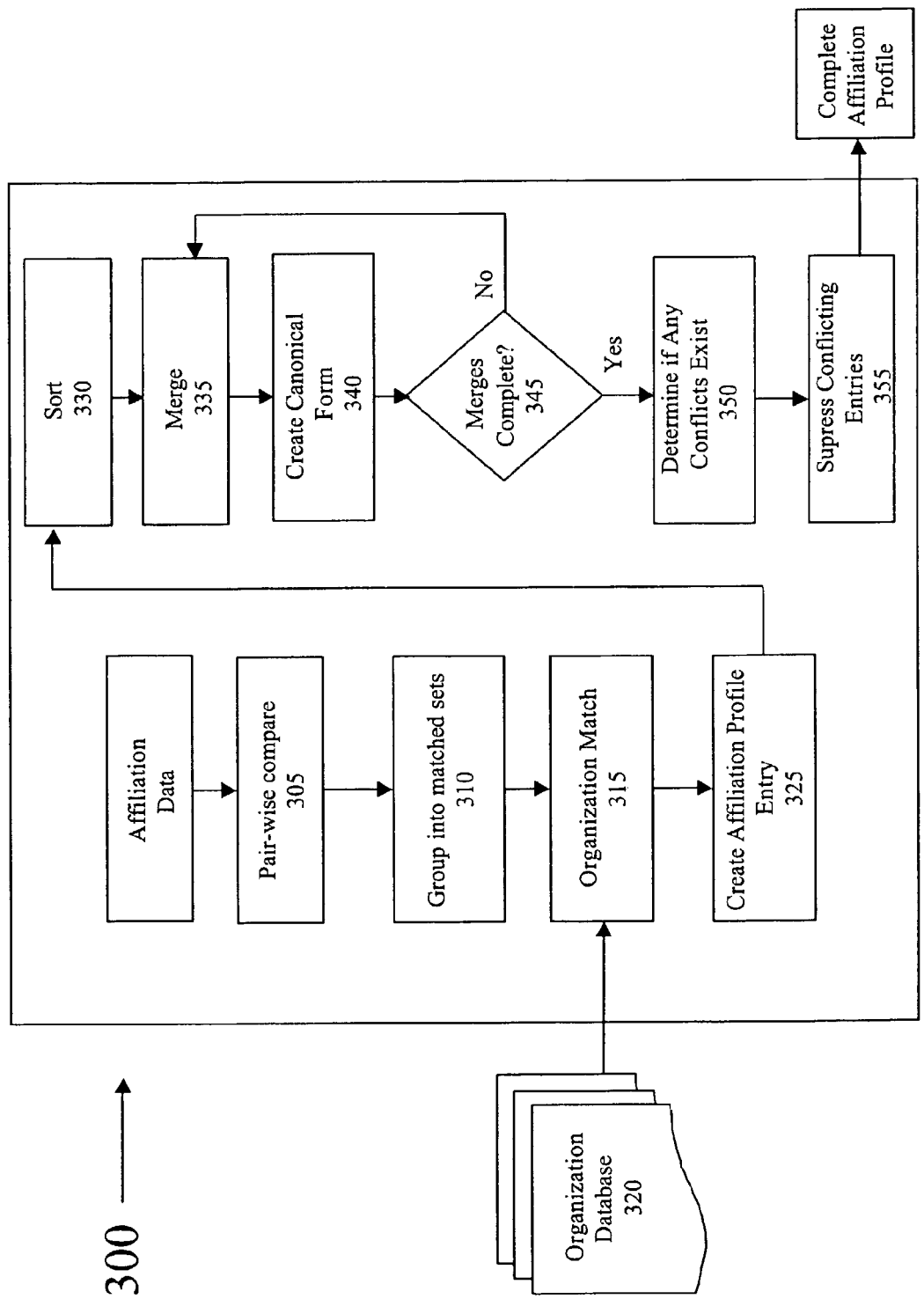
FIG. 10 is a flow diagram of an affiliation profiling method constructed in accordance with one embodiment of the present invention.

Referring now to FIG. 10, another feature of the present invention is illustrated. The illustrated embodiment comprises an affiliation profile software module 300. The affiliation profile module 300 generates an affiliation history of an author. In a preferred embodiment, the affiliation profile module 300 uses data from citation records. Examples of citation records are illustrated in FIG. 11. In this example, each record 30 represents a citation. Each record 30 may or may not be broken down into fields 10 such as author names, article title, publication name, page numbers, year, author affiliations, keywords etc. There may also exist a related collection of records 30 such as the referenced publications themselves that have further information such as the article abstract and the text of the article itself. Citation records may take other forms than those illustrated in FIG. 11, and other types of data may be employed, such as patents, biographies and resumes.

This embodiment of the present invention assembles an expert profile that is created by identifying which papers were authored by the same unique author, while inferring new information about this particular expert, such as the chronological affiliation history of the expert, the area of expertise of the expert, the kind of organization the expert is currently in, the current location of the expert, etc. This type of "expert profile" is illustrated in FIG. 12. The present invention may also extract data from patent records and incorporate patent data in the expert profile.

A preferred embodiment of an author's affiliation history consists of the organization name, address, and the year(s) that the author was at the organization. Other embodiments of the present invention assembles profiles such as institutional and product profiles.

As shown in FIG. 10, affiliation data comprising a number of citation records are provided. In step 305, the records 30 are "pair-wise" compared to determine if an affiliation match exists. An affiliation match is found if the addresses of both affiliations in the two records 30 are compatible and the organization names are compatible. If the two "pair-wise" compared affiliations are a match, then they are grouped into matched sets 310.

Organization name "compatibility" is determined in organization match module 315. Organization match module 315 comprises a set of rules and uses a database of known variations of organization names 320. For example, IBM is compatible with International Business Machines and UC San Diego, UCSD and University of California at San Diego are also compatible.

One rule employed by the organization match module 315 holds that if affiliation names are of sub-organizations, but the parent organizations are compatible then consider the affiliation names to be a match. For example, IBM TJ Watson Research Center at Yorktown Heights in NY and IBM Almaden Research Center at Almaden, Calif. are compatible because both are sub-organizations within IBM.

In step 325, an affiliation profile entry is created for each matched set 310. Preferably, an affiliation profile entry contains: 1) the starting year and ending year of the author's employment with the organization; 2) the canonical affiliation name; and 3) the actual affiliation entry data. For example, an article written by an author in 1990 while at IBM would result in an affiliation entry with 1990 as the value of the year field 10 and IBM as the value of the affiliation field 10. The corresponding value of the affiliation profile entry will have 1990 as the value of both the start and end year, International Business Machines as the value of the canonical affiliation name, and IBM as the value of the actual affiliation entry data field 10. It will be appreciated that affiliation profile entries may include other types of data, such as the current location of the expert, the type of industry the expert is employed in, other experts with similar skill sets, etc.

In step 330, the affiliation profile entries 325 are sorted by their start year. That is, the affiliation profile entries 325 are sorted by the starting year of the author's employment with the organization.

In merge step 335, the affiliation profile entries 325 that are chronologically adjacent in time, and do not have a time gap greater than a predetermined threshold, are merged. For example, an affiliation profile entry 325 having an author starting year at IBM of 1990 is merged with an affiliation profile entry 325 having an author starting year at IBM of 1992 to create a new affiliation profile entry 325 with start year of 1990 and an end year of 1992.

In step 340, the canonical form of the two affiliations being merged is created. Other embodiments of the present invention may not always include this step.

In step 345, the software queries if all possible merge steps 335 are complete. That is, merge step 335 is repeated for all the affiliation profile entries 325 until no more merges can occur.

In step 350 the affiliation profile entries 325 are compared to determine if any conflicts exist. In step 355, any affiliation profile entries 325 that conflict are suppressed. An example of a conflict is when an affiliation profile entry 325 overlaps with another affiliation profile entry 325. An "overlapping" affiliation profile entry 325 occurs when during the generation of affiliation profiles, the system generates profiles that indicate that an expert was at two or more institutions during the same period of time.

One suppression rule employed by the present invention is to suppress the affiliation profile entry 325 if the number of articles associated with an affiliation profile entry 325 is less than a predetermined threshold. Generally, the threshold values used in the present invention are determined empirically. In this specific example, generally, if the number of articles in profiles exceeds the number of another profile by a factor of 2 or more, the present invention would suppress the latter profile.

Another suppression rule employed by the present invention is to determine whether the author was a non-primary author during the suspect period. If there are no mentions of the author in other publications during the period in question, that affiliation profile is suppressed.

What remains at the end of the affiliation profile module 300 is a complete affiliation history of an author. An example of a group of citation records 30 used to generate affiliation profile entries 325 are illustrated in FIG. 11, and a resulting complete affiliation history of the author is illustrated in FIG. 12.

Thus, it is seen that a system and method for assembling records is provided. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent document. Many designs other than the above-described embodiments will fall within the literal and/or legal scope of the following claims, and the present invention is limited only by the claims that follow. It is noted that various equivalents for the particular embodiments discussed in this description may practice the invention as well.

What is claimed is:

1. A non-transitory computer readable medium having computer executable program code embodied thereon, the computer executable program code configured to cause a computer device to identify an unlabeled field within a record by:
   obtaining a target record that is similar to the record;
   automatically pairing a labeled field from the target record with the unlabeled field;
   comparing the labeled field with the unlabeled field; and
   assigning a same field label from the labeled field to the unlabeled field.

2. The computer readable medium of claim 1, wherein the step of obtaining the target record comprises obtaining a substantially complete record.

3. The computer readable medium of claim 1, wherein the step of comparing the labeled field with the unlabeled field comprises determining whether the labeled field is an approximate substring of the unlabeled field.

4. The computer readable medium of claim 1, wherein the step of comparing the labeled field with the unlabeled field comprises generating a match score that represents an amount of similarity between the labeled field and the unlabeled field.

5. The computer readable medium of claim 4, wherein the step of generating the match score that represents an amount of similarity between the labeled field and the unlabeled field comprises generating a numerical value for each of the labeled field and the unlabeled field.

6. The computer readable medium of claim 5, wherein the field is selected from a keyword comprising words that relate to a specific subject.

7. The computer readable medium of claim 1, wherein the unlabeled field is selected from a group consisting of: an author name, a publication title, a journal name, a date of publication, a patent name, an inventor name, a patent publication date, an affiliation, a biography, a resume, a page number, a publication volume, a publication issue, a book title, a publisher name, a geographical location, and a keyword.

8. A non-transitory computer readable medium having computer executable program code embodied thereon, the computer executable program code configured to cause a computing device to label a field within a record by:
   providing an unlabeled field;
   comparing the unlabeled field with a labeled field;
   identifying the labeled field within the unlabeled field; and
   assigning a same field label from the labeled field to the unlabeled field.

9. The computer readable medium of claim 8, wherein the step of comparing the unlabeled field with the labeled field comprises generating a match score that represents an amount of similarity between the unlabeled field and the labeled field.

10. The computer readable medium of claim 9, wherein the step of generating the match score that represents an amount of similarity between the unlabeled field and the labeled field comprises generating a numerical value for each of the unlabeled field and the labeled field.

11. The computer readable medium of claim 8, wherein the step of comparing the labeled field with the unlabeled field comprises determining whether the labeled field is an approximate substring of the unlabeled field.

12. The computer readable medium of claim 8, wherein the field is selected from a group consisting of: an author name, a publication title, a journal name, a date of publication, a patent name, an inventor name, a patent publication date, an affiliation, a biography, a resume, a page number, a publication volume, a publication issue, a book title, a publisher name, a geographical location, and a keyword.

* * * * *